United States Patent
Brömauer et al.

(10) Patent No.: US 10,926,653 B2
(45) Date of Patent: Feb. 23, 2021

(54) TRACTION BATTERY CHARGING ARRANGEMENT

(71) Applicant: Dr. Ing. h.c. F. Porsche Aktiengesellschaft, Stuttgart (DE)

(72) Inventors: Jakob Brömauer, Pfinztal (DE); Thomas Wischnack, Karlsruhe (DE); Steve Zander, Marbach am Neckar (DE); Raoul Heyne, Wiernsheim (DE); Karsten Hähre, Dudenhofen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 138 days.

(21) Appl. No.: 16/253,611

(22) Filed: Jan. 22, 2019

(65) Prior Publication Data
US 2019/0225102 A1    Jul. 25, 2019

(30) Foreign Application Priority Data
Jan. 24, 2018   (DE) .......................... 102018101510.0

(51) Int. Cl.
| | | |
|---|---|---|
| *H02J 7/00* | (2006.01) | |
| *B60L 53/16* | (2019.01) | |
| *H01R 13/66* | (2006.01) | |
| *B60L 53/30* | (2019.01) | |
| *B60L 53/60* | (2019.01) | |
| *B60L 53/66* | (2019.01) | |
| *B60L 3/00* | (2019.01) | |

(52) U.S. Cl.
CPC ............ *B60L 53/16* (2019.02); *B60L 3/0069* (2013.01); *B60L 53/305* (2019.02); *B60L 53/60* (2019.02); *B60L 53/66* (2019.02); *H01R 13/6683* (2013.01); *H02J 7/0031* (2013.01); *B60L 2240/549* (2013.01); *H01R 2201/26* (2013.01)

(58) Field of Classification Search
CPC ....................................................... B60L 53/60
USPC ............................................................ 320/109
See application file for complete search history.

(56) References Cited

U.S. PATENT DOCUMENTS

| | | |
|---|---|---|
| 9,590,416 B2 | 3/2017 | Biurrun Sotelo et al. |
| 10,081,261 B2 | 9/2018 | Grimes et al. |
| 2004/0017643 A1 | 1/2004 | Hartling et al. |
| (Continued) | | |

FOREIGN PATENT DOCUMENTS

| | | |
|---|---|---|
| DE | 102012204862 A1 | 10/2013 |
| DE | 102014111831 A1 | 2/2016 |
| (Continued) | | |

OTHER PUBLICATIONS

Notice of Reasons for Refusal for Japanese Application No. 2019-009263, dated Mar. 18, 2020, 6 pages.

*Primary Examiner* — Edward Tso
*Assistant Examiner* — Ahmed H Omar
(74) *Attorney, Agent, or Firm* — RatnerPrestia

(57) ABSTRACT

A traction battery charging arrangement for charging a traction battery of a motor vehicle. The charging arrangement has a charging station, which has a charging plug or producing an electrical charging connection to the traction battery of the motor vehicle. The charging arrangement furthermore has an electrical safety loop, which has a loop-current source, at least one actuable loop break contact and at least one loop-current sensor. A charging-current control switches off the charging current when the loop-current sensor does not detect a loop current.

10 Claims, 2 Drawing Sheets

(56) References Cited

U.S. PATENT DOCUMENTS

| | | |
|---|---|---|
| 2010/0268406 A1 | 10/2010 | Ito et al. |
| 2011/0234199 A1* | 9/2011 | Baert ................... H01H 47/002 |
| | | 324/72 |
| 2013/0241479 A1 | 9/2013 | Wright et al. |
| 2015/0015188 A1 | 1/2015 | Ono |
| 2016/0096438 A1* | 4/2016 | Grimes ................... B60L 53/66 |
| | | 320/109 |
| 2016/0303986 A1 | 10/2016 | Park et al. |
| 2017/0229820 A1 | 8/2017 | Fuehrer et al. |
| 2017/0320397 A1 | 11/2017 | Zaki et al. |

FOREIGN PATENT DOCUMENTS

| | | |
|---|---|---|
| DE | 102015116105 A1 | 4/2016 |
| JP | 08205376 A | 8/1996 |
| JP | 11299073 A | 10/1999 |
| JP | 2008113505 A | 5/2008 |
| JP | 2015033144 A | 2/2015 |
| WO | 2009087799 A1 | 7/2009 |

* cited by examiner

TRACTION BATTERY CHARGING ARRANGEMENT

CROSS-REFERENCE TO RELATED APPLICATION

This application claims priority to German Patent Application No. DE 10 2018 101 510.0, filed Jan. 24, 2018, which is incorporated by reference herein in its entirety.

FIELD OF THE INVENTION

The invention relates to a traction battery charging arrangement for charging a traction battery of a motor vehicle.

BACKGROUND OF THE INVENTION

A charging arrangement for charging a traction battery of a motor vehicle consists of a plurality of components, in particular of the actual charging station, which has a charging plug for producing an electrical charging connection to the traction battery of the motor vehicle, and the electrical processing of the medium voltage provided from the electricity grid, in order to generate the required charging voltage therefrom. In what are known as charging parks, a multiplicity of charging stations are supplied with electrical power by a processing unit as appropriate. The communication between the components of a charging arrangement or of a charging park takes place via digital communication lines, which in principle, however, are not insensitive with respect to faults, delays, etc., in particular when the charging arrangement components lie spatially further apart from one another. Due to the high electric currents flowing in the charging lines in a charging arrangement, there is generally a relatively high risk of overheating and/or fire. It should therefore be ensured that, in the event of a fault at any component of the entire charging arrangement, all of the components of the charging arrangement are immediately switched off.

SUMMARY OF THE INVENTION

A traction battery charging arrangement has a reliable immediate switch-off system. The traction battery charging arrangement according to aspects of the invention has a charging station, which has a charging plug/socket for producing an electrical charging connection to the traction battery of the motor vehicle. The motor vehicle has a complementary charging plug that corresponds to the charging station charging plug and that is plugged together with the charging station charging plug in order to charge the motor vehicle traction battery so that an electrical charging connection is produced in this way.

The charging arrangement has an electrical processing system and supply system, which supplies the charging station with the charging current, and has a charging-current control means, which switches off the charging current when required.

The charging arrangement furthermore has an electrical safety loop, which has a loop-current source, at least one actuable loop break contact and at least one loop-current sensor. The safety loop thus has a closed circuit having a loop-current source. The loop-current source delivers a loop current having a defined temporal loop current profile in the loop line, for example a constant or non-constant loop current of, for example, 25 mA and/or 15 mA.

The loop break contact is triggered by an associated electrical, electronic or mechanical actuating element and opened as soon as the relevant actuating element determines a defined fault. The actuating element can be, for example, a temperature sensor, which determines the exceedance of a limit temperature, and which opens the relevant loop break contact in the event of a limit temperature exceedance. The actuating element can also be an electronic module, a tilt sensor, a door opening contact, a water-level sensor, etc. A plurality of loop break contacts are particularly preferably provided in the course of the loop line, which loop break contacts are arranged electrically in series in the safety loop or in the loop line and with which loop break contacts actuating elements are associated as necessary.

The loop-current sensor continuously detects the current flowing in the electrical safety loop or in the loop line, for example by way of a voltage tap at a measurement resistor connected in series in the loop line. The loop-current sensor is connected informally or electrically to the charging-current control means. As soon as the loop-current sensor does not detect a loop current in the setpoint flow intensity, the charging current is switched off by the charging-current control means so that the dangers associated with non-switch-off are prevented.

The loop-current source is preferably informally or electrically associated with an installation controller, which switches on the loop-current source before the installation controller permits the switch-off of the charging current on account of the information available to it.

The safety loop is or the loop lines are preferably DC-isolated from the rest of the electrical system and electronics system of the charging arrangement in order to exclude ground loops in this way.

In accordance with a preferred refinement, provision is made of a supply unit, which is formed separately from the charging station and which is connected to the charging station by means of an electrical charging-current line. The safety loop runs through both the supply unit and the charging station. Both the supply unit and the charging station each have at least one loop-current sensor and a respective charging-current control means associated with the loop-current sensor.

The charging station can be arranged at a distance from the supply unit and placed so that the noise emissions of the supply unit can be displaced locally to where they are less of a disturbance. The charging station can be positioned, for example, up to 100 m or even further away from the supply unit. A plurality of charging stations can be connected to a supply unit.

The charging-current control means of the supply unit mays be a power electronics system, which generates the charging current in the necessary charging voltage. The charging station may not have a power electronics system that is to be cooled using a heat exchanger cooling unit, with the result that the charging station can be designed in a very compact manner. Owing to the omission of a relatively loud cooling system, the noise emissions at the charging station that are associated therewith are also dispensed with. The charging station is therefore subjected to only low legal restrictions and has a high quality of convenience.

In accordance with a preferred refinement, both the charging station and the supply unit each have at least one loop break contact. In this way, even in the case of a relatively large distance between the charging station and the supply unit, faults at any location of the charging arrangement can quickly lead to switch-off of the charging voltage.

In accordance with a preferred refinement, the loop-current source is designed in such a way that it generates a positive alternating signal. This is understood to mean, for example, a low-frequency alternating signal, which does not change its polarity, but alternates, for example, between two current flow plateaus in alternating fashion, for example at a frequency in the single-figure hertz range. By way of example, the alternating signal can be a square-wave signal that alternates between 25 mA and 15 mA at a frequency of 5 Hz. The alternating signal is evaluated by the loop-current sensor. If there is no alternating signal present but there is a positive direct signal, the loop-current source is possibly faulty, with the result that it is also possible to identify this and to react to this with suitable measures.

The loop-current source is preferably designed in such a way that it can generate the alternating signal selectively at at least two different alternating frequencies. The loop-current source can transmit simple information to the loop-current sensors in this way. For example, the selected charging standard or charging voltage can thus be transmitted by means of the alternating frequency.

The loop-current source is preferably arranged in the charging station. The charging standard or the charging voltage is selected or determined in the charging station. As soon as this has taken place, the charging station is basically ready for charging so that the loop-current source is switched on and the charging standard or the charging voltage is transmitted to the supply unit by means of the alternating frequency in the safety loop. This produces additional safety and redundancy with respect to the charging standard or charging voltage.

BRIEF DESCRIPTION OF THE DRAWING

In the following text, an exemplary embodiment is explained in more detail with reference to the figures, in which.

DETAILED DESCRIPTION OF THE INVENTION

Figure 1:
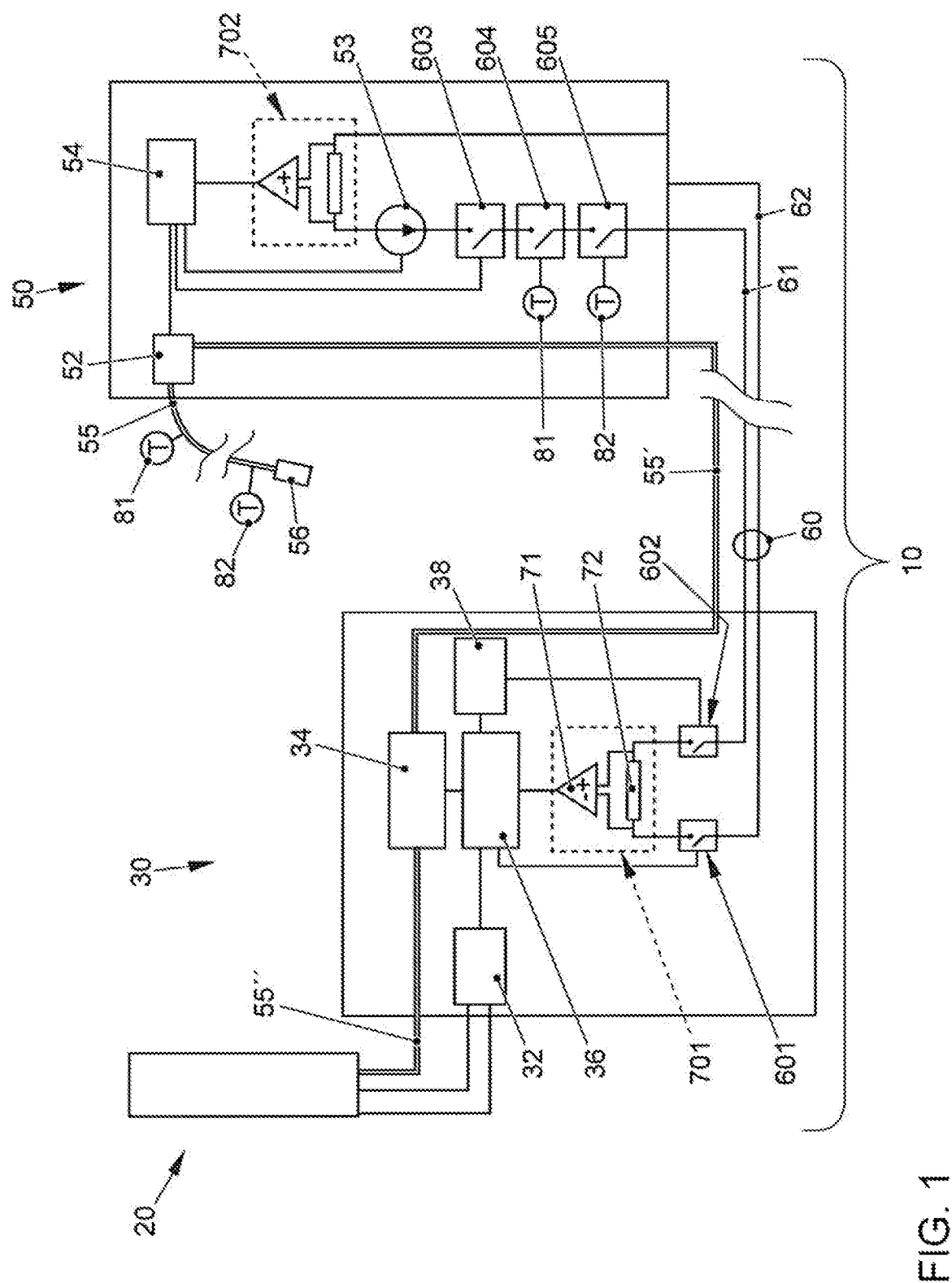
FIG. 1 shows a schematic illustration of a traction battery charging arrangement having an electrical safety loop.

FIG. 1 schematically illustrates a traction battery charging arrangement 10 for charging a traction battery of a motor vehicle. In the present case, the charging arrangement 10 is of modular design and essentially has an optional transformation unit 20, a supply unit 30 and a charging station 50.

The optional transformation unit 20 transforms the voltage coming from a medium-voltage grid of 10-20 kV to a low voltage of below 1000 V, which is the operating voltage or the input voltage of the supply unit 30 and is provided to the supply unit 30 by means of a supply line 55".

The supply unit 30 has a charging-current control means 34 having a power electronics system, by way of which the infect low voltage is converted to the charging voltage, which is intended to be used to charge the traction battery of the connected motor vehicle. Since the power electronics system generates a lot of heat at charging powers of several 100 kW, the supply unit 30 has a cooling apparatus 38, which has a heat exchanger and a compressor, and which essentially serves to cool the power electronics system of the charging-current control means 34.

Finally, the supply unit 30 has a supply unit controller 36, which controls, synchronizes and monitors all of the constituent parts of the supply unit 30 and undertakes the communication of the supply unit 30 with the other components of the charging arrangement 10. To this end, the supply unit 30 has an optional interface module 32 by means of which the supply unit controller 36 can communicate with the transformation unit 20.

The charging station 50 has a charging station controller 54, a charging cable 55 having a charging plug 56 and a charging-current control means 52 for connecting the charging voltage through to the charging plug 56. The charging voltage generated in the charging-current control means 34 is fed into the charging station 50 by way of a charging-current line 55'. The charging station 50 is positioned at a distance from the supply unit 30, for example at a distance of more than 10 m from the supply unit 30. The charging station 50 does not have a noteworthy power electronics system and therefore does not have or has only a small heat exchanger cooling apparatus for the charging cable to the cooling unit, with the result that the noise emissions of the charging station 50 are relatively low.

In the present exemplary embodiment, only one single charging station 50 is associated with the supply unit 30. In principle, however, a plurality of individual charging stations 50 arranged at a distance can also be associated with a single supply unit 30.

The charging arrangement 10 has an electrical safety loop 60, which can have a plurality of components, which are provided both in the supply unit 30 and in the charging station 50. The safety loop 60 consists from an electrical point of view essentially of two loop lines 61, 62 between the supply unit 30 and the charging station 50, a loop-current source 53 in the charging station 50, a plurality of loop break contacts 601-605 in the charging station 50 and in the supply unit 30 and a respective loop-current sensor 701, 702 in the charging station 50 and in the supply unit 30. All of the aforementioned components are connected electrically in series and form a closed circuit.

In the present exemplary embodiment, the supply unit 30 has two loop break contacts 601, 602, which are actuated by the cooling apparatus 38 and by the supply unit controller 36. As soon as the cooling apparatus 38 or the supply unit controller 36 detects a fault, the associated loop break contact 601, 602 is activated so that the safety loop 60 is electrically open.

In this exemplary embodiment, the loop-current sensor 701, 702 is essentially formed by a measurement resistor 72 and an operational amplifier 71 and emits a proportional voltage signal dropped across the measurement resistor 72 to the connected supply unit controller 36.

The charging station 50 has three loop break contacts 603, 604, 605. Two of said loop break contacts 604, 605 are actuated or connected by a respective temperature sensor 81, 82. The two temperature sensors 81, 82 are arranged in the charging cable 55 and monitor the temperature in the charging cable 55. As soon as one of the temperature sensors 81, 82 determines the exceedance of a limit temperature, this is signaled to the associated loop break contact 604, 605, which then opens. The loop-current sensor 702 of the charging station 50 is of identical construction to the loop-current sensor 701 of the supply unit 30 and transmits the voltage signal dropped across the relevant measurement resistor to the charging station controller 54. The third loop break contact 603 of the charging station 50 is actuated by the charging station controller 54 itself.

Figure 2:
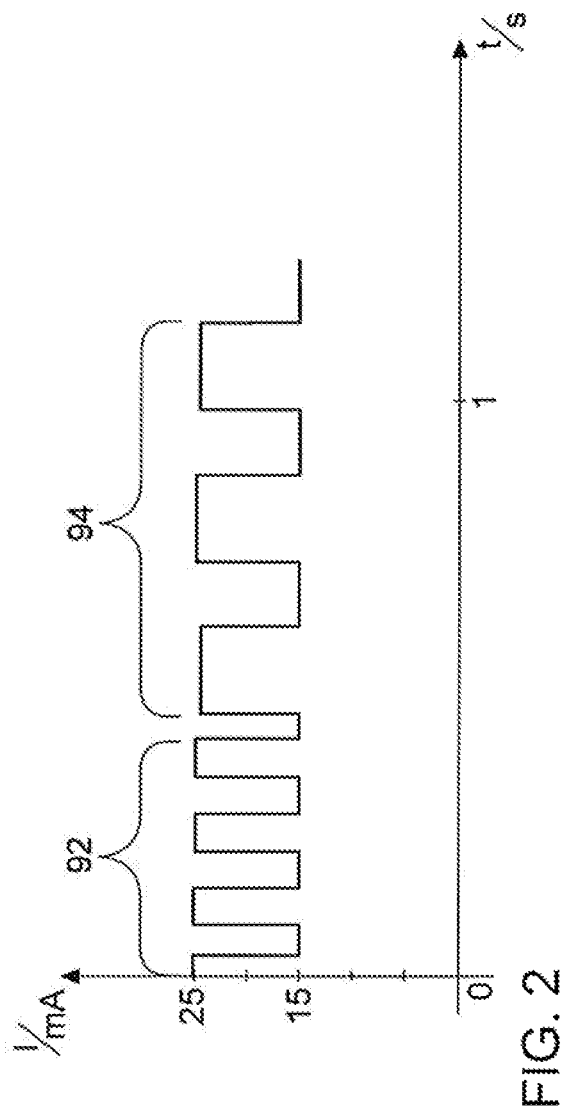
FIG. 2 shows a time profile of a loop current in the safety loop of the charging arrangement of FIG. 1.

As soon as the desired charging standard or charging voltage is selected at the charging station 50 and before the charging procedure is started, the loop-current source 53 is activated. In the present case, the loop-current source 53 generates a positive alternating signal, which is illustrated by way of example in FIG. 2. In the present case, the alternating signal is a square-wave signal, which alternates between 15 mA and 25 mA at a frequency in the low single-figure hertz range. Depending on the selected charging standard or charging voltage, the loop-current source 53 generates an alternating signal 92 at a frequency of, for example, 8 Hz or an alternating signal 94 at a frequency of 5 Hz. In the case of three different operable charging standards or charging voltages, the three frequencies required for this can be, for example, 1 Hz, 3 Hz and 8 Hz.

As long as not all of the loop break contacts 601-605 are closed, the two loop-current sensors 701, 702 signal a zero signal and hence the non-readiness to the associated charging-current control means 34, 52, with the result that no charging current flows. Only when all of the loop break contacts 601-605 are closed are the two charging-current control means 34, 52 closed, with the result that the charging current can flow through the charging-current line 55' and the charging cable 55 to the charging plug 56.

The charging voltage that is required is unambiguously signaled to the supply unit controller 36 by means of the frequency of the alternating signal 92, 94 in the safety loop 60. If there is no correlation here with the information about the charging standard or the charging voltage delivered by means of another information channel, the supply unit controller 36 can immediately open the associated loop break contact 601. For the case that the charging station controller 54 detects inconsistencies or faults, the charging station controller 54 opens the associated loop break contact 603.

As soon as one of the loop-current sensors 701, 702 does not detect an alternating signal 92, 94 or, however, does not detect the expected alternating signal 92, 94, measures are taken by the controllers 36, 54 to protect the charging arrangement 10 against damage.

What is claimed is:

1. A traction battery charging arrangement for charging a traction battery of a motor vehicle, the traction battery charging arrangement comprising:
    a charging station, which has a charging plug for producing an electrical charging connection to the traction battery of the motor vehicle,
    an electrical safety loop, which has a loop-current source, at least one actuable loop break contact and at least one loop-current sensor, and
    a charging-current control means, which is configured to switch off the charging current when the loop-current sensor does not detect a loop current.

2. A traction battery charging arrangement for charging a traction battery of a motor vehicle, the traction battery charging arrangement comprising:
    a charging station, which has a charging plug for producing an electrical charging connection to the traction battery of the motor vehicle,
    an electrical safety loop, which has a loop-current source, at least one actuable loop break contact and at least one loop-current sensor, and
    a charging-current control means, which is configured to switch off the charging current when the loop-current sensor does not detect a loop current;
    a supply unit, which is formed separately from the charging station and which is connected to the charging station by an electrical charging-current line, wherein the electrical safety loop runs through both the supply unit and the charging station, and wherein the supply unit and the charging station each have at least one loop-current sensor and a respective charging-current control means associated therewith.

3. The traction battery charging arrangement as claimed in claim 2, wherein the charging-current control means of the supply unit is configured as a power electronics system, which generates the charging current in a necessary charging voltage.

4. The traction battery charging arrangement as claimed in claim 2, wherein both the charging station and the supply unit each have at least one loop break contact.

5. The traction battery charging arrangement as claimed in claim 1, wherein the loop-current source is configured in such a way that it generates a positive alternating signal.

6. The traction battery charging arrangement as claimed in claim 5, wherein the loop-current source is configured to generate the positive alternating signal selectively at at least two different alternating frequencies.

7. The traction battery charging arrangement as claimed in claim 1, wherein the loop-current source is arranged in the charging station.

8. The traction battery charging arrangement as claimed in claim 1, wherein the loop break contact is functionally associated with a temperature sensor in such a way that the loop break contact is configured to open as soon as the temperature sensor signals an exceedance of a limit temperature.

9. The traction battery charging arrangement as claimed in claim 1, wherein the plurality of the loop break contacts are arranged electrically in series in the electrical safety loop.

10. A traction battery charging arrangement for charging a traction battery of a motor vehicle, the traction battery charging arrangement comprising:
    a charging station, which has a charging plug for producing an electrical charging connection to the traction battery of the motor vehicle,
    an electrical safety loop, which has a loop-current source, at least one actuable loop break contact and at least one loop-current sensor, and
    a charging-current control means, which is configured to switch off the charging current when the loop-current sensor does not detect a loop current;
    a supply unit, which is formed separately from the charging station and which is connected to the charging station by an electrical charging-current line, wherein the electrical safety loop runs through both the supply unit and the charging station.

* * * * *